July 23, 1968  P. T. TROELL ET AL  3,394,216
CORE-TYPE INDUCTION FURNACE
Filed Nov. 10, 1965  2 Sheets-Sheet 1

INVENTORS
PETER T. TROELL &
ALBERT L. RENKEY
BY William C. Dealer
ATTORNEY

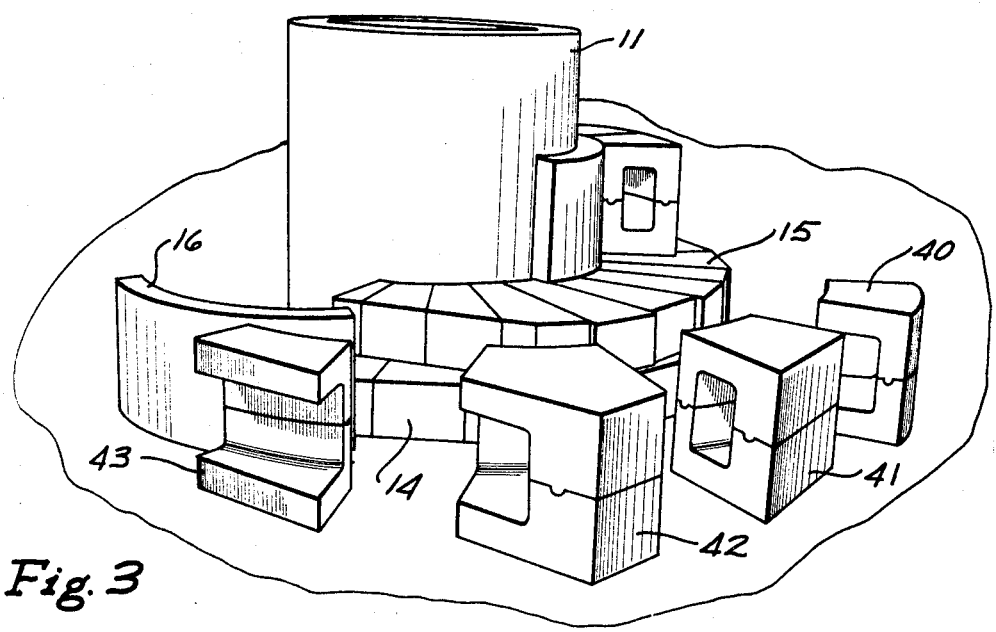
Fig. 3
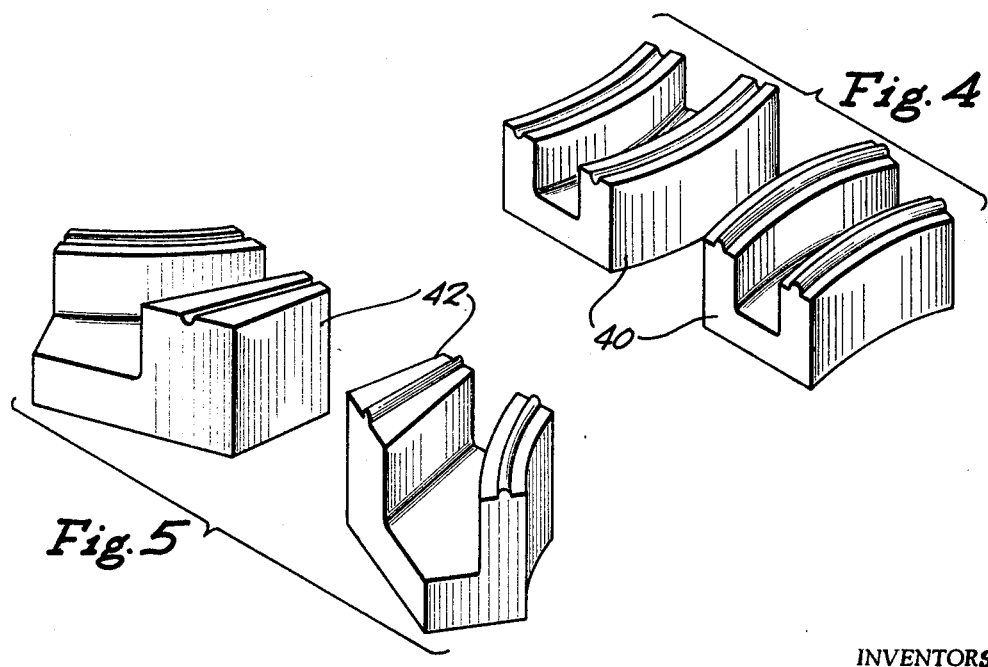
Fig. 4
Fig. 5
INVENTORS
PETER T. TROELL &
ALBERT L. RENKEY
BY
ATTORNEY United States Patent Office 3,394,216
Patented July 23, 1968

3,394,216
CORE-TYPE INDUCTION FURNACE
Peter T. Troell and Albert L. Renkey, Pittsburgh, Pa., assignors to Dresser Industries, Inc., Dallas, Tex., a corporation of Delaware
Filed Nov. 10, 1965, Ser. No. 507,199
6 Claims. (Cl. 13—30)

ABSTRACT OF THE DISCLOSURE

Channel induction furnace including molten metal-containing chamber section and an inductor block section defining at least one arcuate tubular channel opening at two ends with said chamber, the improvement being the tubular channel defined by a plurality of mating preformed curved sections.

---

In a channel induction furnace, the inductor block has conventionally been rammed with a good quality monolithic refractory using melt or burnout forms to form the channels through which molten metal will eventually circulate. Ramming this section is a time-consuming and most exacting job and, since development of cracks or variations in density can be disastrous, initial drying and heatup of the inductor block section has been gradual and time-consuming. Also, since inductor blocks are typically relined several times within one campaign for the holding portion of the furnace, replacement of the rammed block section can result in extended furnace downtime for repairs, which is most undesirable.

It is therefore an object of this invention to provide an easily installed inductor block assembly of prefabricated parts. It is a further object of the invention to provide an inductor block assembly of prefabricated parts, thereby allowing use of materials of known and predictable physical properties, i.e., no substantial variation in density, thus providing greater assurance of uniform refractory life. Yet further, it is an object of the invention to provide a prefabricated inductor block assembly which provides increased safety, in that it is particularly resistant to metal penetration from the channel to the coil. Possible cracking is controlled by use of mortar in, and proper spacing of, all joints between prefabricated parts.

Briefly, according to one aspect of this invention, in a channel induction furnace of the type including a molten metal-containing chamber section and an inductor block section defining at least one arcuate tubular channel interconnected at both ends with said chamber, there is provided a plurality of mating preformed arcuate sections which cooperate to define said channel. In a preferred embodiment, all of said shapes are dip-coated or trowelled with a chemically compatible mortar.

Other objects and further features and advantages of our invention will become readily apparent to those skilled in the metallurgical and ceramic arts by a study of the attached drawings and the following detailed discussion thereof. In these drawings:

FIG. 3 is a composite schematic drawing illustrative of the preformed sections at a stage of installation in the fabrication of one of the inductor block assemblies of FIGS. 1 and 2; and FIGS. 4 and 5 are perspective views of two different mating pairs of the arcuate sections which cooperate to define the molten metal channel of the inductor block assembly.

Figure 1:
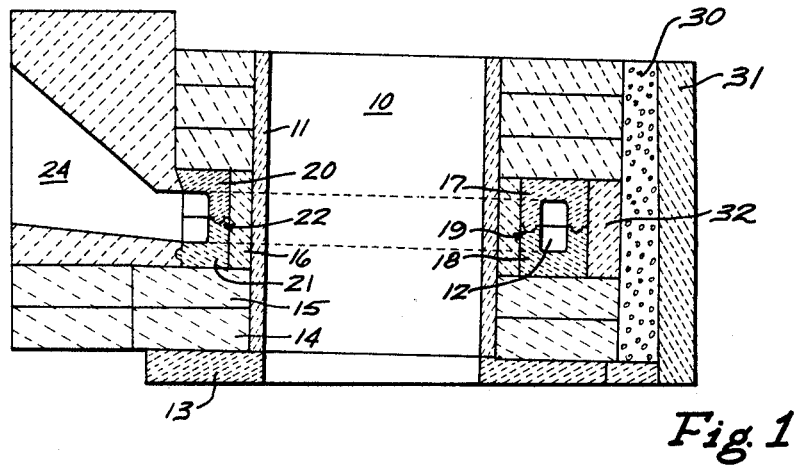
FIG. 1 is a side sectional view of an inductor block assembly according to this invention.

Before describing the drawings in detail, we wish it understood they are but exemplary of one embodiment of our invention, and that other constructions are possible within the spirit and scope of our invention which is defined by the hereafter appended claims.

In the drawings, we have not shown the molten metal-containing chamber which communicates with the inductor block, feeling such is well known and would merely complicate a clear description of the present invention.

Further, in the drawings, we have shown a pair of indicator block assemblies placed side-by-side. It is, of course, understood that the invention is equally applicable to those furnaces having but one inductor block assembly or any number greater than two that the skilled metallurgist could conceivably think necessary. In any event, in FIG. 1 there is shown an annular construction. The open tubular center area 10 encapsulates electrical coils, but we have omitted them to maintain drawing simplicity. About these coils is a first ceramic tube 11. The ceramic tube 11 is electrically nonconductive, since it is desired that heat be generated in the arcuate channel 12, and not in the various refractory materials which form the channel. Upon any suitable base 13 we have shown two layers 14 and 15 of conventional key-cut refractory brick. The drawings are substantially to scale, so one skilled in the art (knowing that we have shown No. 4 keys for layers 14 and 15 having the approximate dimensions 9 x 4½ x 3", and that twenty-six such keys are used for each circumferential layer 14 and 15) can clearly understand the comparative sizes of other pieces subsequently described. On top of the layer 15 are found the performed elements which are the crux of our invention. Broadly, on top of layer 15 is found a plurality of mating preformed arcuate sections which form the channel 12. In the preferred embodiment, however, there is additionally found a plurality of arcuate sections 16 which contiguously overlie the exterior surface of the ceramic shell 11. Contiguously abutting the outer surface of the sections 16 are the preformed shapes. In FIG. 1, since it is a sectional view, two different pairs of mating shapes are shown. On the right-hand side we find the two mating sections 17 and 18, which are actually mirror images of each other, or at least substantially so, the only difference being the tongue and groove-type keying system 19 to assure good fit.

The other pair of preformed sections shown in FIG. 1, strictly speaking, are not U-shaped. They are more V-shaped, and they in part provide the opening from the channel. These are elements 20 and 21 in FIG. 1 having the tongue and groove configuration 22 and opening into the block 23 which forms the channel 24 which opens into the molten metal-containing chamber.

On top of the preformed sections, we have shown three more layers of conventional key shapes. Surrounding the major portion of the foregoing assembly is a conventional ramming mix or castable 30, and containing it is the outermost ring of refractory brick 31. Additionally, there is the plurality of arcuate shapes 32 which form a closed arc about the preformed shapes and separate them from the ramming mix 30.

Figure 2:
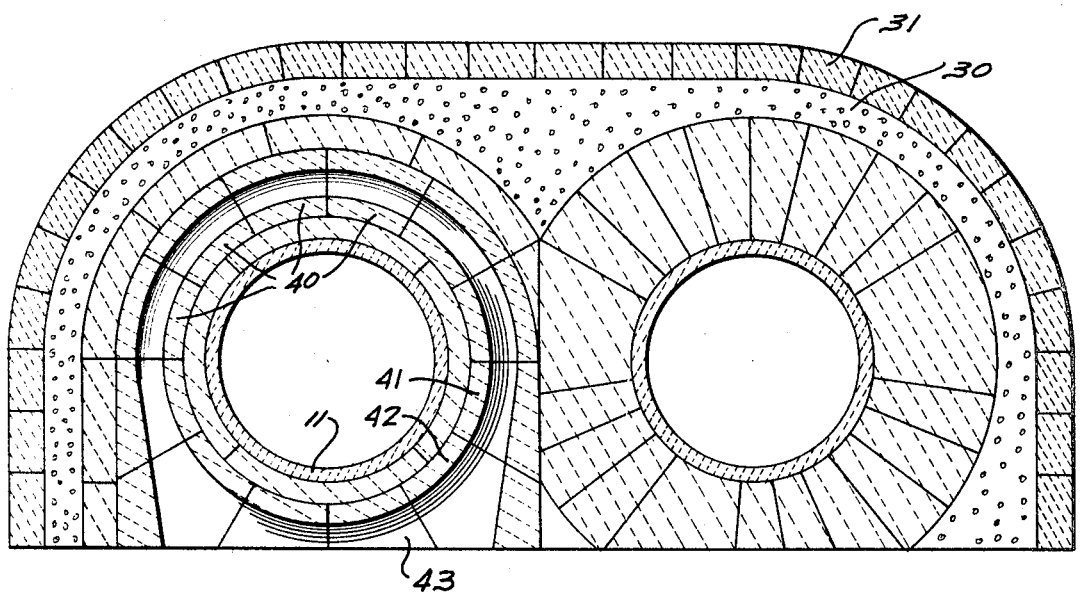
FIG. 2 is a top sectional view throughout the inductor block assembly of FIG. 1.

FIG. 2, which is a sectional view at two different levels through the assembly of FIG. 1, provides a clearer picture of the arrangement of key shapes in layers 14 and 15, and also provides a better idea of the number and configuration of the various preformed shapes required to make the channel 12.

In FIG. 3 we have shown, somewhat schematically, an inductor assembly of the type shown in FIGS. 1 and 2 as it might appear at an intermediate stage of construction. We have used some like reference numerals to indicate like parts. FIGS. 4 and 5 are intended merely as illustrative of what a mating pair of mirror image sections used for the constructions of FIGS. 1 through 3 appear like before assembly. In the arrangement shown in FIGS. 1 and 2, it should be noted there are five mating pairs of the type of shape shown in FIG. 4 (disassembled in FIG. 4). Reference numeral 40 is applied to members of this group. There are three other different type shapes; namely, shapes 41, 42, and 43, as seen in FIG. 2. FIG. 5 is of shape 42, disassembled. As can be recognized, section 43 is comprised of the pieces 20 and 21 seen in FIG. 1.

The foregoing construction, in summary, provides the following advantages:

(1) It facilitates installation and replacement of damaged parts. It is possible that a major part of the refractory assembly necessary for fabrication of an inductor block or blocks to be fabricated beforehand and easily laid in place, within the shell or shells will define the inductor section, by a bricklayer.

(2) Greatly improved refractory quality is possible. The use of preformed shapes means that one can provide known and predictable physical properties, i.e., density, porosity, strength, etc., since such properties are more easily assured in preformed shapes, at least as compared to previous rammed or cast constructions.

(3) Our invention provides increased safety. The preformed shapes are so designed that metal penetration from the channel to the coil is highly unlikely. Joints between the various shapes which make up our assembly are preferably staggered, i.e., no substantial amount of joint in the shapes making up the channel 12 communicate with joints between the shapes 16 nor the joints between the refractory brick above and below the special shapes. Possible cracking is thus controlled, since any cracking is expected to be through joints (mortar joints) and will not propagate through the plurality of layers of refractory material between the coils and the channel confining the molten metal.

In the interest of a more complete description of the invention, we here list the preferred refractories for a preferred embodiment of the invention. For the preformed channel sections, the member 23 and the member 11, we prefer the refractory disclosed and claimed in United States Patent No. 3,067,050, and particularly that embodiment consisting of about 90%, by weight, of 99% purity alumina, 5% volatilized silica, and 5% of potter's flint. For the layers 14 and 15 and the other layers of key shapes above the channel, we prefer a high alumina shape also, but one of somewhat less purity; for example, one having the following chemical analysis:

| | Percent |
|---|---|
| Alumina ($Al_2O_3$) | 71.3 |
| Silica ($SiO_2$) | 23.9 |
| Titania ($TiO_2$) | 2.9 |
| Iron oxide ($Fe_2O_3$) | 1.3 |
| Lime, magnesia, alkalies | 0.9 |

This (and the other brick just discussed) is of course a burned brick. Such a brick is sold in the trade under the trade-mark "Alusite D."

For the base 13 and the outer layer 31, we suggest insulating brick. We prefer one sold under the trade-mark "H-W 26." Chemically, it consists of about 54.6% silica; about 40.1% alumina; about 1.2% titania; iron oxide amounts to about 2.4%; lime, magnesia, and alkalies together total about 2%. The castable 30 can be practically any high alumina castable or ramming mix, but we suggest the one sold in the trade under the trade-mark "H-W High alumina castable." It is a refractory concrete material comprised of an accurately sized, high alumina aggregate blended with high alumina binders.

While the exemplary refractory materials are all so-called "high alumina" refractories, such are by no means the only type usable. Practically any type fired refractory oxide or spinel shape can be used. Such materials include magnesite, dolomite, chrome ore, zircon, zirconia, various fire clays and silicas, etc.

Another particular refractory which we suggest is one made according to the teachings of United States Patent No. 3,180,744, relating to a direct-bonded type of magnesia-chrome ore brick.

Having thus described this invention in detail and with sufficient particularity as to enable those skilled in the art to practice it, what is desired to have protected by Letters Patent is set forth in the following claims.

We claim:

1. In a channel induction furnace of the type including a molten metal containing chamber section and an inductor block section defining at least one arcuate tubular channel opening at two ends with said chamber, the improvement comprising said tubular channel being defined by a plurality of mating preformed curved sections, each of said curved sections being comprised of a pair of substantially mirror image mating pieces, all but two pair of said mating sections being generally U-shaped in cross-section.

2. In a channel induction furnace of the type including a molten metal containing chamber section and an inductor block section defining at least one arcuate tubular channel opening at two ends with said chamber, the improvement comprising said tubular channel is formed by construction comprised of a plurality of preformed, fired, refractory oxide or spinel shapes, said plurality of preformed shapes being comprised of a first group consisting of a plurality of mating preformed arcuate sections which define said channel, a second group of preformed pieces being generally arcuate in cross-section and abutting about said plurality of channel-forming sections, and an additional plurality of arcuate pieces contiguously abutting another side of said plurality of mating sections forming said channel opposed to said second group.

3. The furnace of claim 1 in which all of said mating sections further include complementary interlocking means for the pieces forming the sections.

4. The furnace of claim 3 in which said interlocking means consists of tongue and groove elements formed in respective abutting portions of each said pair.

5. The induction furnace of claim 1 in which said plurality of mating preformed sections is supported on the topmost of a plurality of layers of conventional key shapes laid circumferentially about the coils of said furnace.

6. The furnace of claim 2 in which there is additionally provided a tubular ceramic member separating said second group of preformed pieces from the coils of said induction furnace.

References Cited

UNITED STATES PATENTS

| 3,249,676 | 5/1966 | Rydinger et al. | 13—30 |
| 3,334,171 | 8/1967 | Fredrikson et al. | 13—29 |

RICHARD M. WOOD, *Primary Examiner.*

L. H. BENDER, *Assistant Examiner.*